Jan. 23, 1968    M. L. BENJAMIN ET AL    3,364,823
FLUID MOTOR AND CONTROL VALVE ASSEMBLY THEREFOR
Filed July 9, 1965    2 Sheets-Sheet 1

INVENTORS.
MILTON L. BENJAMIN
FRANKLYN E. WINNEN
RONALD F. BLUHM
BY
*Oberlin, Maky & Donnelly*
ATTORNEYS Jan. 23, 1968    M. L. BENJAMIN ET AL    3,364,823
FLUID MOTOR AND CONTROL VALVE ASSEMBLY THEREFOR
Filed July 9, 1965    2 Sheets-Sheet 2

INVENTORS.
MILTON L. BENJAMIN
FRANKLYN E. WINNEN
RONALD F. BLUHM
BY
*Oberlin, Maky & Donnelly*
ATTORNEYS United States Patent Office 3,364,823
Patented Jan. 23, 1968

3,364,823
FLUID MOTOR AND CONTROL VALVE
ASSEMBLY THEREFOR
Milton L. Benjamin, Chagrin Falls, Franklyn E. Winnen, Cleveland, and Ronald F. Bluhm, Euclid, Ohio, assignors to Erickson Tool Company, Solon, Ohio, a corporation of Ohio
Filed July 9, 1965, Ser. No. 470,785
9 Claims. (Cl. 91—420)

This invention relates generally, as indicated, to a fluid motor and flow control valve assembly therefor, especially of the type such as may be employed in actuating a chuck.

Of course, fluid operated chucks are generally old and well known, as is the provision of some type of auxiliary means such as a spring to hold the fluid motor in chucking position when there is some fluid leakage or even a complete loss of the fluid pressure which is used to actuate the chuck. Accordingly, if the fluid pressure is released or otherwise lost, there is no danger of the chuck jaws moving to work re'easing position with subsequent damage to machinery or injury to workmen, at least not while the chuck is rotating at relatively slow speeds and very little force is being exerted on the workpiece by a cutting tool and the like. However, there is a substantial reduction in the gripping force with only the auxiliary holding means in use, so much so in fact that if the chuck is rotating at relatively high speeds and considerable force is applied to the workpiece by a cutting tool, the workpiece may still fly from the chuck and cause considerable damage.

The amount of force exerted by the springs tending to hold the chuck jaws in gripping position depends of course on the number of springs used and the force exerted by each spring. Thus, by increasing the size and number of springs, it is possible to exert a force of a rather high magnitude with the auxiliary holding means. Generally, though, the springs used are not capable of exerting a very high gripping force, since otherwise there would be little or no need for providing fluid pressure for actuating the chuck.

The obvious disadvantage of relying solely on springs for the gripping force is their inability to exert reduced gripping forces when high gripping forces are not needed. Also, the force exerted by the springs has to be overcome as by fluid pressure when it is desired to release the chuck. Moreover, if the springs are relatively large, it will be necessary to increase the size of the cylinder of the fluid motor to accommodate the springs, thereby adding substantially to the overall size of the motor.

It is therefore a principal object of this invention to provide a fluid motor and novel flow control valve assembly therefor which is effective to hold a chuck or the like in chucking position without any loss in the gripping force even though there may be a complete loss of fluid actuating pressure.

A further object is to provide such a fluid motor and control valve assembly therefor which is effective in transmitting the desired amount of gripping force to the jaws of a chuck and maintaining such gripping force even should there be a failure in the fluid system which actuates the motor.

Another object is to provide a fluid motor with a novel flow control valve assembly which prevents inadvertent loss of fluid pressure acting on the motor piston.

Still another object is to provide a fluid motor with such a control valve assembly which automatically traps fluid within the motor tending to actuate it in one direction, but which releases the trapped fluid in response to fluid pressure tending to move the motor in the opposite direction.

Another object is to provide such a hydraulic motor and control valve assembly with a novel check valve and spool valve arrangement which traps fluid in the motor cylinder tending to move the motor piston in one direction so long as there is little or no fluid pressure tending to move the piston in the opposite direction, but which permits the trapped fluid to escape when the fluid pressure tending to move the piston in such opposite direction is high.

Another object is to provide a fluid motor and novel control valve assembly of the type described above which is relatively simple in construction and compact, and the control valve assembly does not substantially add to the overall length of the motor.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but several of the various ways in which the principles of the invention may be employed.

Figure 1:
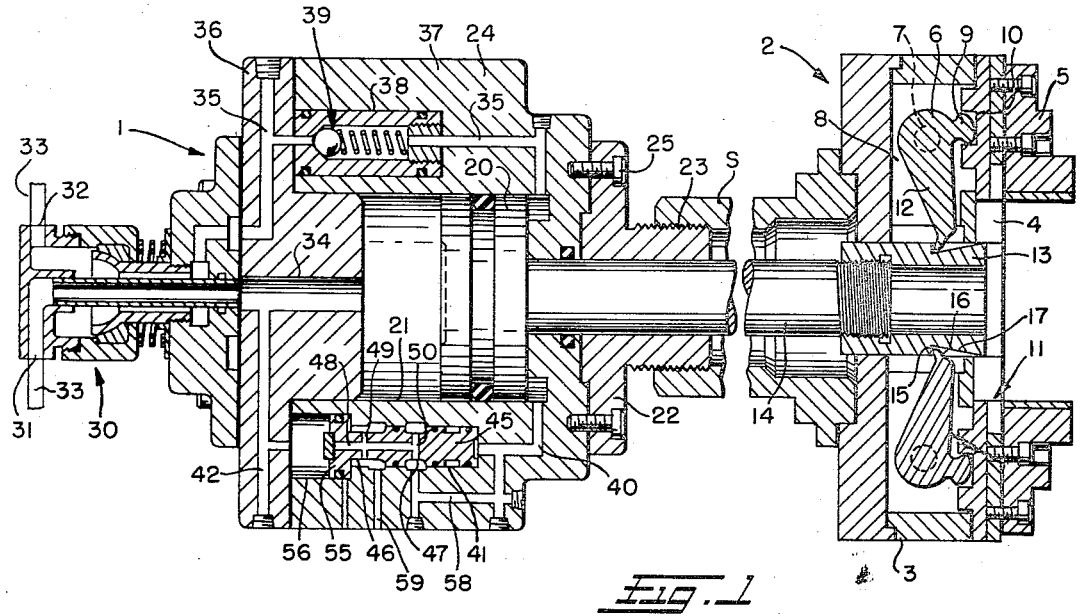
FIG. 1 is a longitudinal section of a preferred form of fluid motor and control valve assembly therefor constructed in accordance with the present invention shown operatively connected to a chuck or the like with the jaws of the chuck being in the workpiece releasing position.
Figure 2:
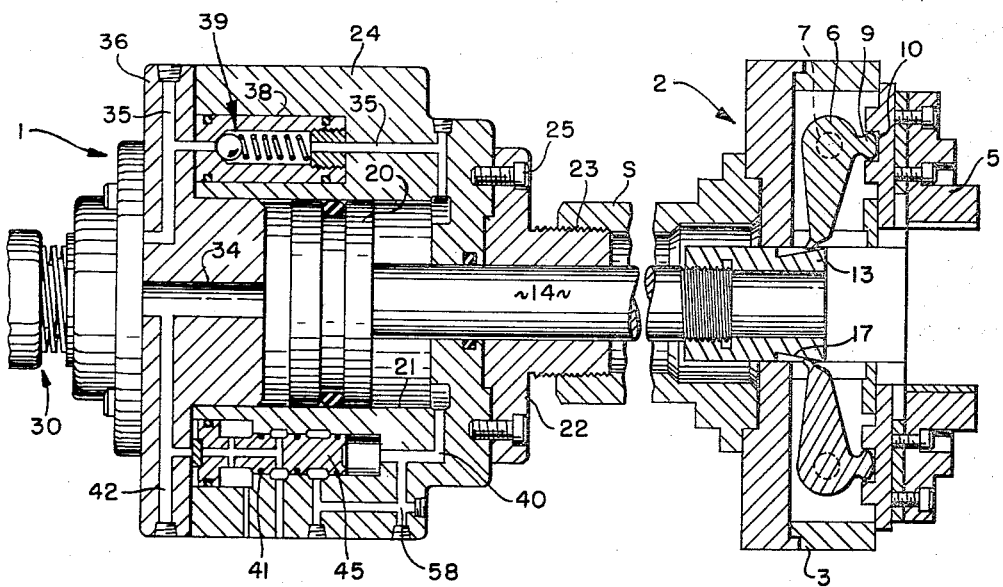
FIG. 2 is a longitudinal section identical to FIG. 1, except that the jaws of the chuck are shown in workpiece gripping position.

Referring now to the details of the drawing, and first of all to FIGS. 1 and 2, a preferred form of fluid motor and control valve assembly therefor is generally indicated at 1, it being shown operatively connected to a chuck 2 of any conventional type. However, it should be understood that the fluid motor and control valve assembly 1 could be used to actuate devices other than chucks, such as hoists for front end loaders and the like.

The chuck 2 illustrated comprises a body 3 having a plurality of radial slots 4 in which there are slidably received work gripping jaws 5. Radial movement of the jaws 5 into and out of work gripping position is achieved through pivotal movement of operating levers 6 mounted on trunnions 7 in recesses 8 in the body 3. As clearly shown, the jaw operating levers 6 each include a generally axially outwardly extending arm 9 which is received in a slot 10 in the jaw mountings 11, and a generally radially inwardly extending arm 12 which is adapted to be pivoted in either a clockwise or counterclockwise direction, depending on the direction in which a slider element 13 carried by a draw rod 14 is moved. Thus, for example, if the draw rod 14 and slider 13 are moved to the right as shown in FIG. 1, a shoulder 15 on the slider 13 engages the free end 16 of the jaw levers 6 and causes the jaw levers to rotate in a counterclockwise direction, thereby moving the jaws 5 radially out of gripping engagement with a workpiece disposed therebetween. Conversely, when the draw rod 14 and slider 13 are moved toward the left to the FIG. 2 position, the wedge surface 17 on the slider 13 engages the jaw levers 6 and causes them to rotate in a clockwise direction, thereby moving the jaws 5 radially inward into workpiece gripping engagement.

The chuck body 3 is suitably secured to a spindle S for rotational movement therewith when driven by a machine tool, not shown, in conventional manner. The draw rod 14 is secured to a piston 20 which is reciprocable in the cylinder 21 of the fluid motor 1 and the fluid motor 1 is mounted on the rear end of the spindle S as by a suitable coupling 22 threadedly engaging the spindle S at 23 and attached to the housing 24 of the fluid motor 1 by fasteners 25.

Mounted on the opposite end of the housing 24 is a swivel coupling 30 of conventional type having a pair of ports 31 and 32 through which air or other suitable fluid under pressure is selectively admitted into the cylinder 21 to move the piston 20 in opposite directions. As is well known, the swivel coupling 30 permits rotation of the motor housing 24 and spindle S on which it is mounted, while the lines 33 communicating the coupling ports 31 and 32 with a pressure supply source, not shown, are held stationary.

The port 31 is in fluid communication with a central passage 34 in the motor housing 24 running to the left end of the cylinder 21, while the port 32 communicates with another passage 35 in the housing 24 leading to the right end of the cylinder. Preferably, the housing 24 is made in two parts 36 and 37, and the passage 35 is enlarged at 38 in the part 37 for receipt of a conventional type one-way check valve 39 which permits air or other such operating fluid to flow through the passage 35 into the right end of the cylinder 21, but not in the reverse direction.

The housing part 37 has another passage 40 therein which communicates the right end of the cylinder 21 with the central passage 34 in the housing part 36 through a stepped counterbore 41 in the housing part 37 and a branch passage 42 in the housing part 36. Disposed within the stepped counterbore 41 is a differential spool valve 45 having a pair of axially spaced annular grooves 46 and 47 in fluid communication with each other through a central passage 48 and transverse passages 49 and 50, respectively. Adjacent the annular groove 46 the spool valve 45 is enlarged somewhat at 55 for sliding engagement with an enlarged portion 56 of the stepped counterbore 41, thereby acting as a stop for limiting movement of the spool valve 45 in either direction.

With the spool valve 45 in the extreme right position shown in FIG. 1, the right end of the cylinder 21 is in communication with the atmosphere (or a reservoir, not shown, if the actuating fluid is oil, for example) through the passage 40, a branch passage 58 leading from the passage 40 to the counterbore 41 adjacent the annular groove 46, the passages 48, 49, and 50 in the valve 45, and a passage 59 communicating the counterbore 41 adjacent the annular groove 46 with the atmosphere. With the spool valve 45 in the extreme left position shown in FIG. 2, however, fluid communication between the right end of the cylinder 21 and the atmosphere is blocked by the spool valve 45.

*Operation*

When it is desired to actuate the fluid motor 1 and control valve assembly therefor to move the chuck 2 or other such device to workpiece gripping position, air under pressure is admitted to the right end of the cylinder 21 through the port 32 and check valve 39 to cause the piston 20 to move to the left to the FIG. 2 position. At the same time, the high pressure entering the right end of the cylinder 21 also acts on the right end of the spool valve 45 and moves it to the extreme left position shown in FIG. 2, whereat fluid communication between the right end of the cylinder 21 and atmosphere is blocked. Any pressure acting on the opposite side of the piston 20 is exhausted from the left end of the cylinder 21 through the central passage 34 and port 31.

As is readily apparent, the check valve 39 permits the passage of air under pressure through the passage 35 to the right end of the cylinder 21, but not the return of such air. Accordingly, once the jaws 5 of the chuck are moved into tight gripping engagement with a workpiece, they will be maintained in such position as long as desired even though there may be some fluid leakage from the system or even a complete loss of fluid pressure from the main supply line.

Release of such trapped air and thus release of the chuck jaws 5 from a workpiece can only be effected by moving the spool valve 45 to the extreme right position shown in FIG. 1 to communicate the right end of the cylinder 21 with the atmosphere. This is accomplished by admitting air under pressure through the port 31 to the left end of the cylinder 21 and spool valve 45 via the passages 34 and 42, respectively. The valve 45 will be caused to move even though high pressure may be acting on the other end of the valve, since the effective area of the valve enlargement 55 on which the pressure from the port 31 acts is substantially greater than the area of such other end; i.e., alve 45 is a differential spool valve.

Figure 3:
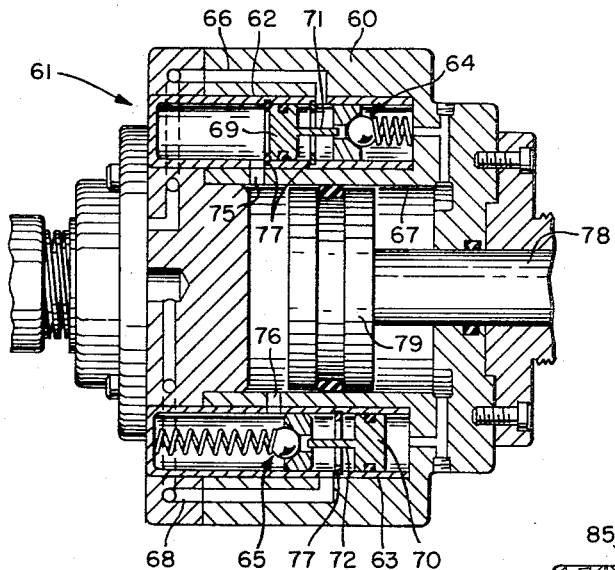
FIGS. 3–5 are fragmentary longitudinal sections of various other forms of fluid motors and control valve assemblies therefor in accordance with the present invention.
Figure 4:
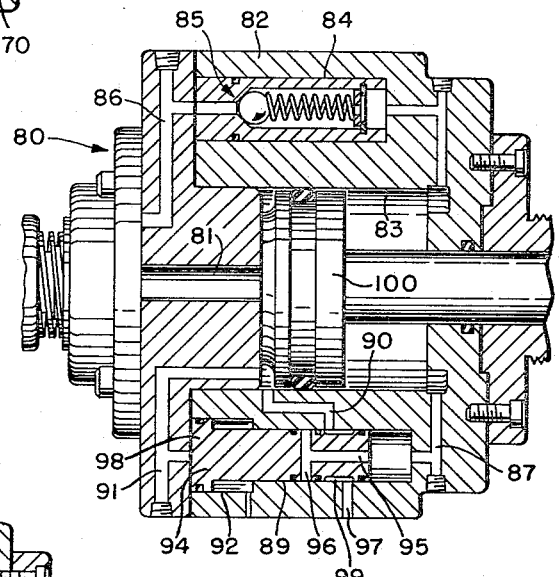
Figure 5:
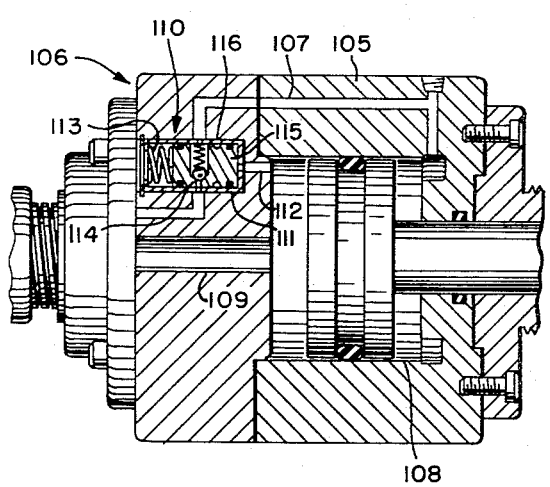

In FIGS. 3–5 there are shown various other forms of hydraulic motors and control valve assemblies therefor which operate in substantially the same manner as does the hydraulic motor 1 of the FIGS. 1 and 2 embodiment. However, the construction of the control valve assemblies for trapping the air pressure within the right end of the cylinder 21 until a substantially high air pressure is admitted to the other end of the cylinder is somewhat different. In the FIG. 3 embodiment, for example, the housing 60 for the fluid motor and control valve assembly 61 is provided with a pair of counterbores 62 and 63 in which there are disposed one-way check valves 64 and 65, respectively, the check valve 64 being disposed in the passage 66 for permitting fluid under pressure to flow from the port 32 (see FIGS. 1 and 2) to the right end of the motor cylinder 67, but not in the reverse direction; and the check valve 65 permitting fluid under pressure to flow from the port 31 (also see FIGS. 1 and 2) through the passage 68 into the left end of the cylinder 67, but not in the reverse direction. Also within the counterbores 62 and 63 are plungers 69 and 70, respectively, having projections or stems 71 and 72 which are adapted to be moved by fluid pressure to unseat the check valves and thus permit the escape of trapped fluid from the ends of the cylinder 67, in a manner which will be fully explained hereafter.

The counterbore 62 outwardly of the plunger 69 is in fluid communication with the left end of the cylinder 67 via a passage 75, while the counterbore 63 is in fluid communication with the right end of the cylinder 67 inwardly of the plunger 69 via a passage 76, and stops in the form of snap rings 77 may be provided in the counterbores 62 and 63 for limiting movement of the plungers 69 and 70 to prevent them from blocking the various fluid passages 66, 75, and 76.

The chuck jaws 5 of FIGS. 1 and 2 are moved into workpiece gripping engagement by the fluid motor 61 of the FIG. 3 embodiment through actuation of the draw rod 78 toward the left, as in FIG. 2. Such leftward movement of the draw rod 78 is accomplished by admitting air under pressure through the port 32, passage 66, and check valve 64 to the right end of the cylinder 67 to cause movement of the piston 79 to the left. The fluid under pressure acting on the piston 79 also acts on the plunger 70 to move it to the left until its stem 72 unseats the other check valve 65 and thereby permits air to be exhausted from the other end of the cylinder 67 through the passage 76, check valve 65, passage 68, and port 31. Of course, the air acting on the piston 79 to move it to the left will not be permitted to return through the check valve 62, at least not when low pressure is in the other end of the cylinder. Accordingly, even a complete loss of the air pressure will not affect the gripping force already being exerted by the chuck jaws 5 on a workpiece.

Only when air under pressure is admitted through the port 31 to the left end of the cylinder 67 via the passages 68 and 76 and check valve 65 will the chuck jaws 5 be released. The high pressure entering the left end of the cylinder 67 enters the counterbore 62 through the passage 75 and acts on the plunger 69 to move it to the right until its stem 71 unseats the check valve 64, whereby the air which had been trapped at the other end of the cylinder is permitted to escape through check valve 64, passage 66, and port 32.

The hydraulic motor and control valve assembly 80 shown in FIG. 4, like the hydraulic motor and control valve assembly 1 of FIG. 1, has a passage 81 extending through the motor housing 82 communicating the port 31 with the left end of the motor cylinder 83, and there is a counterbore 84 in the housing in which there is disposed a check valve 85 for permitting fluid to flow through the passage 86 from the port 32 to the right end of the cylinder 83, but not in the reverse direction. For exhausting fluid from both ends of the cylinder 83 there is provided a passage 87 in the housing 82 communicating the right end of the cylinder 83 with the left end of such cylinder through a stepped counterbore 89 and a pair of passageways 90 and 91, the passageway 90 leading to the mid portion of the counterbore 89 and the passageway 91 leading to the enlarged end portion 92 thereof. A spool valve 94 is slidably received in the stepped counterbore 89, it being provided with a central passage 95 and a transverse passage 96 in fluid communication therewith. There is also provided a passage 97 in the housing 82 which communicates the counterbore 89 with the atmosphere at a position axially offset from the passage 90.

The spool valve 94 has an enlargement 98 on its left end for limiting the movement of the valve in the enlarged portion 92 of the counterbore 89. When the valve 94 is in the extreme left position shown in FIG. 4, the axially offset passages 90 and 97 are in fluid communication with each other via an annular groove 99 in the valve 94. However, when the valve 94 is moved to the extreme right position, fluid communication between the passages 90 and 97 is blocked, but fluid communication between the right end of the cylinder 83 and the atmosphere is established via the passages 87 and 97 in the housing 82 and the axial and transverse passages 95 and 96 in the valve 94.

Thus, movement of the piston 100 to the left as viewed in FIG. 4 to cause movement of the jaws 5 into work gripping engagement (FIG. 2) is effected by admitting air under pressure to the right end of the cylinder 83 via passage 86 and check valve 85. As the air pressure builds up in the right end of the cylinder, it acts on the right end of the spool valve 94 to move it to the extreme left position shown in FIG. 4, whereat fluid communication between the left end of the cylinder 83 and the atmosphere is established through the passages 90 and 97 and annular groove 99 to exhaust fluid therefrom. As in the two previously described embodiments, the air in the right end of the cylinder 83 is not permitted to escape, that is, not until air under pressure is admitted to the left end of such cylinder through the central passage 81 to cause the spool valve 94 to move to the extreme right position whereat the right end of the cylinder 83 is exhausted to the atmosphere via passages 87, 95, 96, and 97.

In the FIG. 5 embodiment, as in the FIGS. 1 and 4 embodiments, the housing 105 for the hydraulic motor and control valve assembly 106 has a passage 107 communicating the port 32 with the right end of the cylinder 108, and a central passage 109 communicating the left end of the cylinder 108 with the port 31. However, in this latter form there is provided a combination check valve and spool valve assembly 110 disposed in a counterbore 111 which intersects the passage 107 and is in fluid communication with the left end of the cylinder 108 via passage 112. Normally, the combination check valve and spool valve assembly 110 is held in the position shown in FIG. 5 by a spring 113 with the check valve 114 positioned in axial alignment with the passage 107 to permit air under pressure to flow from the port 32 to the right end of the cylinder 108. However, when air under pressure is admitted to the left end of the cylinder 108 from the port 31 through the central passage 109, as when it is desired to disengage the chuck jaws 5, it acts on the right end of the spool 115 to cause the same to move against the bias of the spring 113 until an annular groove 116 formed in the spool 115 is brought into axial alignment with the passage 107. When this condition occurs, the fluid pressure trapped in the right end of the cylinder 108 is permitted to escape back through the port 32. Of course, when fluid is being admitted under pressure to the right end of the cylinder 108, the left end thereof is exhausted back through the central passage 109 and port 31.

From the above discussion, it should now readily be apparent that the various forms of hydraulic motors and control valve assemblies therefor as described herein can very effectively be employed to actuate a chuck or the like into and out of workpiece gripping position without any appreciable delay. Yet, should there be leakage of the motor actuating fluid or even a complete loss of fluid pressure when the chuck is in workpiece gripping position, the grip on the workpiece will still be maintained as long as desired.

Other modes of applying the principles of the invention may be employed, change being made as regards the details described, provided the features stated in any of the following claims or the equivalent of such be employed.

We, therefore, particularly point out and distinctly claim as our invention:

1. In a fluid motor and control valve assembly, a housing having a motor cylinder therein, a piston slidably received in said cylinder, passages in said housing for communicating the ends of said cylinder with a fluid pressure source, means for trapping fluid in one end of said cylinder, whereby the fluid pressure in said one end of said cylinder is maintained even though the pressure of the fluid pressure source may be subsequently reduced, and means for permitting the fluid trapped in said one end of said cylinder to escape in response to high fluid pressure being directed into the other end of said cylinder, said means for trapping the fluid as aforesaid comprising a one-way check valve, and said means for permitting the trapped fluid to escape in response to high fluid pressure being directed to the other end of said cylinder comprising a spool valve means disposed in a bore in fluid communication with both ends of said cylinder, said spool valve means having an enlarged portion which is acted on by the fluid pressure in said other end of said cylinder and a smaller portion acted on by the fluid pressure in said one end of said cylinder, said spool valve means also having a pair of axially spaced transverse passages interconnected by an axial passage, said spool valve means when acted upon by high fluid pressure in said one end of said cylinder being adapted to be moved to a first position whereat fluid communication between said one end of said cylinder and a passageway communicating said bore with the exterior of said housing is blocked, and when acted upon by high fluid pressure in the other end of said cylinder, said spool valve means is adapted to be moved to a second position whereat fluid communication between said one end of said cylinder and said passageway is established via a branch passage in said housing which communicates said one end of said cylinder with one of said transverse passages in said spool valve means.

2. In combination, a fluid motor and a control valve assembly for controlling the flow of fluid to and from at least one end of said motor, said motor comprising a housing having a motor cylinder therein and a piston mounted for reciprocating movement in said cylinder; and said control valve assembly comprising a one-way check valve means for trapping fluid entering one end of said cylinder from a fluid pressure source, whereby should there be a subsequent reduction in the pressure of said source, the fluid pressure within said one end of said cylinder will still be maintained, and means for releasing the trapped fluid from said one end of said cylinder, comprising a spool valve means disposed in a bore in fluid communication with both ends of said cylinder, said spool valve means having an enlarged portion which is acted on by the fluid pressure in said other end of said cylinder and a smaller portion acted on by the fluid pressure in said one end of said cylinder, said spool valve means also having a pair of axially spaced transverse passages interconnected by an axial passage, said spool valve means when acted upon by high fluid pressure in said one end of said cylinder being adapted to be moved to a first position whereat fluid communication between said one end of said cylinder and a passageway communicating said bore with the exterior of said housing is blocked, and when acted upon by a high fluid pressure in the other end of said cylinder, said spool valve means is adapted to be moved to a second position whereat fluid communication between said one end of said cylinder and said passageway through said housing is established via a branch passage in said housing which communicates said one end of said cylinder with one of said transverse passages in said spool valve means.

3. In a fluid motor and control valve assembly, a housing having a motor cylinder therein, a piston slidably received in said cylinder, passages in said housing for communicating the ends of said cylinder with a fluid pressure source, means for trapping fluid in one end of said cylinder, whereby the fluid pressure in said one end of said cylinder is maintained even though the pressure of the fluid pressure source may be subsequently reduced, and means for permitting the fluid trapped in said one end of said cylinder to escape in response to high fluid pressure being directed to the other end of said cylinder, said means for trapping the fluid as aforesaid comprising a one-way check valve, and said means for permitting the trapped fluid to escape in response to high fluid pressure being directed to the other end of said cylinder comprising a spool valve means slidably received in a bore in said housing, one end of said bore being in fluid communication with said other end of said cylinder, a pair of passages in said housing in communication with said bore, one of said passages extending to the exterior of said housing and the other extending to said one end of said cylinder, means for moving said spool valve means to a first position blocking fluid communication between said pair of passages, and passage means in said spool valve means through which said pair of passages are communicated upon movement of said spool valve means to a second position in response to high fluid pressure in said other end of said cylinder, the other end of said bore being in fluid communication with said one end of said cylinder for effecting such movement of said spool valve means to such first position in response to high fluid pressure in said one end of said cylinder, said spool valve means having an enlarged portion which is acted on by the fluid pressure in said other end of said cylinder and a smaller portion acted on by fluid pressure in said one end of said cylinder.

4. The fluid motor and control valve assembly of claim 3 wherein said passage means in said spool valve means comprises a pair of axially spaced transverse passages interconnected by an axial passage, said spool valve means when in such second position establishing fluid communication between said pair of passages via said transverse and axial passages in said spool valve means.

5. The fluid motor and control valve assembly of claim 3 further comprising a third passage in said housing communicating said other end of said cylinder with said bore axially offset from said passage extending to the exterior of said housing, said passage means in said spool valve means comprising a transverse passage and an axial passage communicating said transverse passage with the end of said bore in communication with said one end of said cylinder, said spool valve means when in such first position communicating said other end of said cylinder with the exterior of said housing via said axially offset passages and an annular groove in said spool valve means, and when in said second position communicating said one end of said cylinder with the exterior of said housing via the passages in said spool valve means and said passage extending to the exterior of said housing.

6. The fluid motor and control valve assembly of claim 3 wherein said passage means in said spool valve means comprises a transverse passage and an axial passage communicating said transverse passage with the end of said bore in communication with said one end of said cylinder, means are provided for limiting the movement of said spool valve means when acted on by fluid pressure in said one end of said cylinder to a position communicating said other end of said cylinder to the exterior of said housing via the other end of said bore which is in fluid communication with said one end of said cylinder, an annular groove in said spool valve means, and said passage extending to the exterior of said housing, and means are provided for limiting the movement of said spool valve means when acted on by fluid pressure in said other end of said cylinder to a position communicating said one end of said cylinder with the exterior of said housing via said passages in said spool valve means and said passage extending to the exterior of said housing.

7. In a fluid motor and control valve assembly, a housing having a motor cylinder therein, a piston slidably received in said cylinder, passages in said housing for communicating the ends of said cylinder with a fluid pressure source, means for trapping fluid in one end of said cylinder, whereby the fluid pressure in said one end of said cylinder is maintained even though the pressure of the fluid pressure source may be subsequently reduced, and means for permitting the fluid trapped in said one end of said cylinder to escape in response to high fluid pressure being directed to the other end of said cylinder, said means for trapping the fluid as aforesaid comprising a one-way check valve, and said means for permitting the trapped fluid to escape in response to high fluid pressure being directed to the other end of said cylinder comprising a spool valve means slidably received in a bore in said housing, one end of said bore being in fluid communication with said other end of said cylinder, a pair of passages in said housing in communication with said bore, one of said passages extending to the exterior of said housing and the other extending to said one end of said cylinder, means for moving said spool valve means to a first position blocking fluid communication between said pair of passages, and passage means in said spool valve means through which said pair of passages are communicated upon movement of said spool valve means to a second position in response to high fluid pressure in said other end of said cylinder.

8. The fluid motor and control valve assembly of claim 7 wherein said one-way check valve is contained in said spool valve means, said means for moving said spool valve means to such first position whereat fluid is permitted to flow through said check valve to said one end of said cylinder when the pressure in said other end of said cylinder is low comprising a spring, and said passage means in said spool valve means through which said pair of passages are communicated upon movement of said spool valve means to such second position in response to high fluid pressure in said other end of said cylinder comprising an annular groove in said spool valve means for communicating said one end of said cylinder with an exhaust port when the pressure in the other end of said cylinder is sufficient to overcome said spring and move said spool valve means to such second position.

9. The fluid motor and control valve assembly of claim 7 wherein said passage means in said spool valve means comprises an annular groove through which fluid communication between said pair of passages is established when said spool valve means is in said second position, and said means for moving said spool valve means to a first position comprises a spring disposed between said spool valve means and the other end of said bore, said one-way check valve being disposed in said spool valve means for permitting fluid to flow to said one end of said cylinder through said pair of passages when said spool valve means is in said first position.

References Cited

UNITED STATES PATENTS

| | | | |
|---|---|---|---|
| 1,550,550 | 8/1925 | McCauley | 137—609 |
| 2,568,092 | 9/1951 | Sloan. | |
| 3,006,323 | 10/1961 | Tilney | 91—240 |
| 3,020,057 | 2/1962 | Gamet | 279—4 |
| 3,074,384 | 1/1963 | Pilch | 91—420 |
| 3,198,088 | 8/1965 | Johnson et al. | 91—420 |

MARTIN P. SCHWADRON, *Primary Examiner.*

ROBERT C. RIORDON, *Examiner.*

P. E. MASLOUSKY, *Assistant Examiner.*